Figure 6:
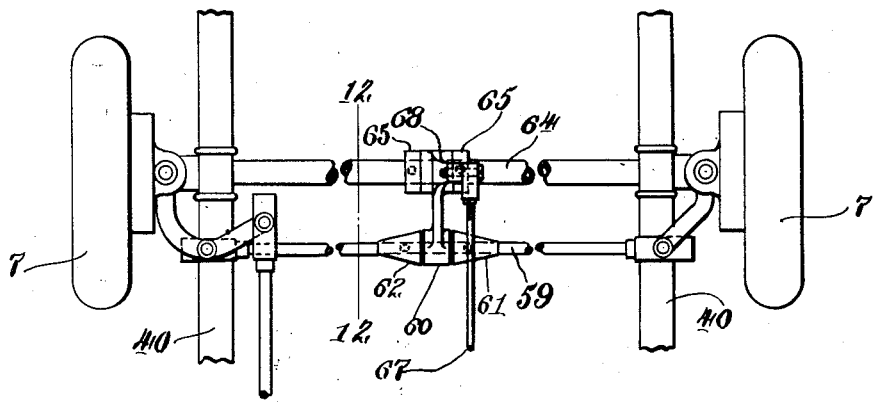

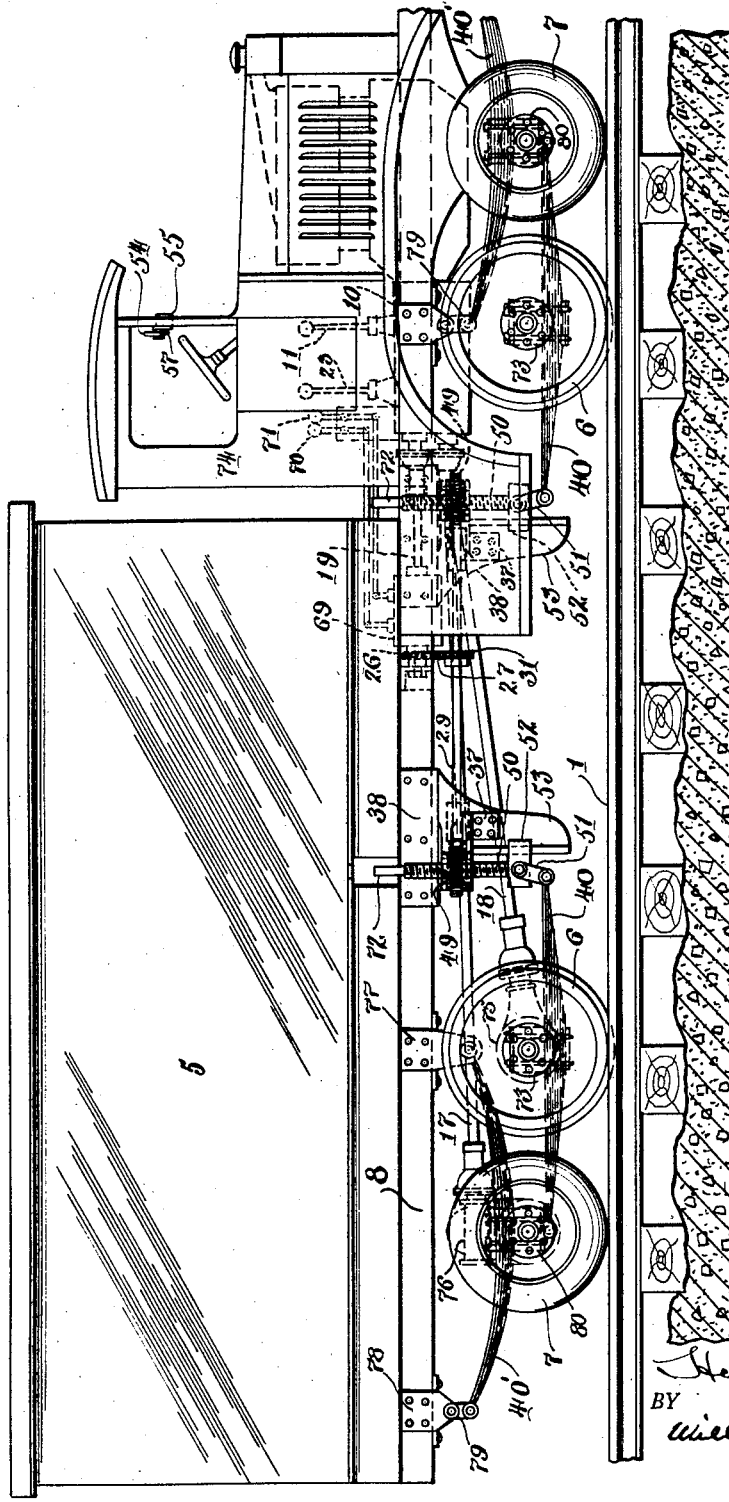

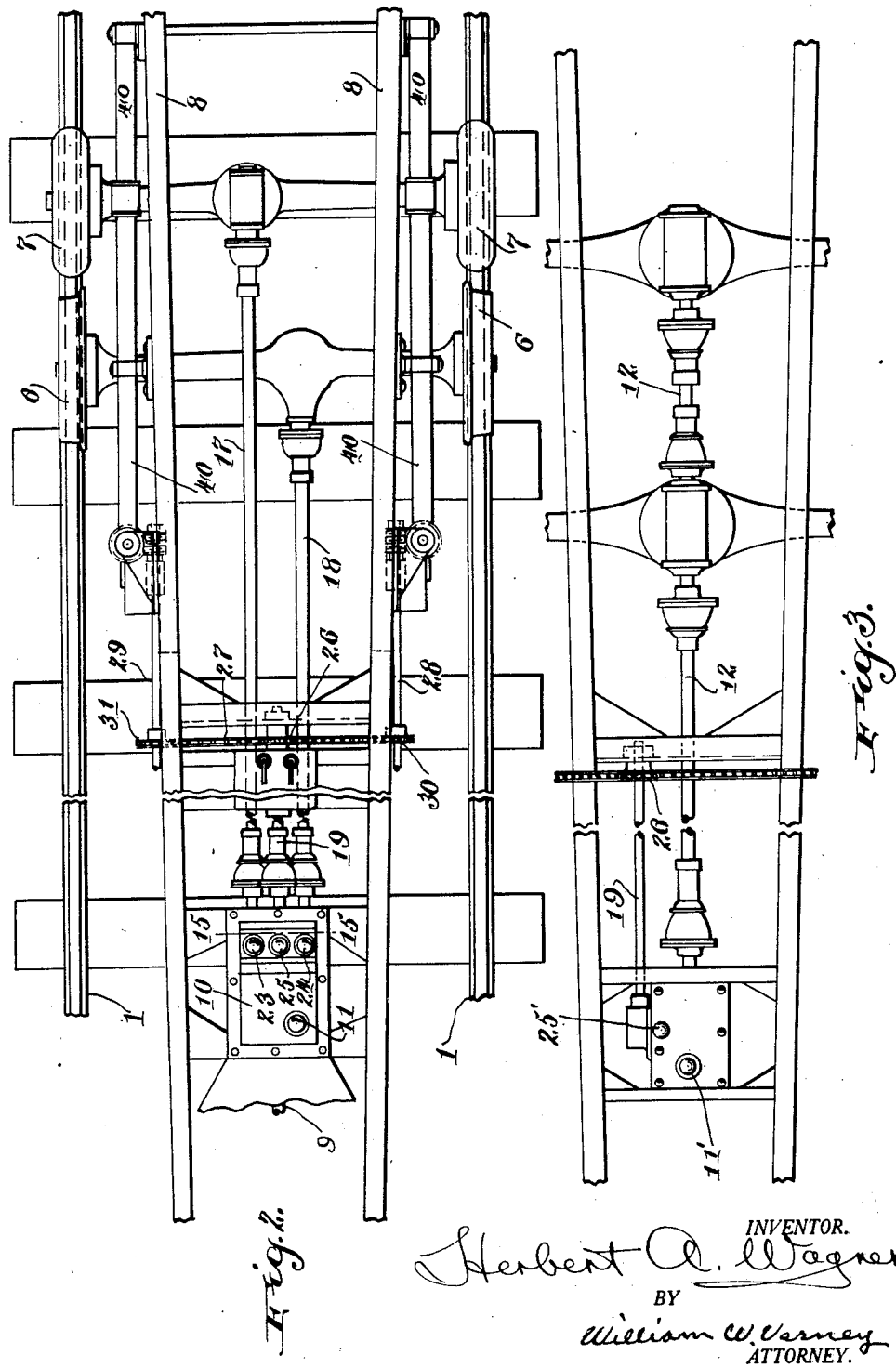

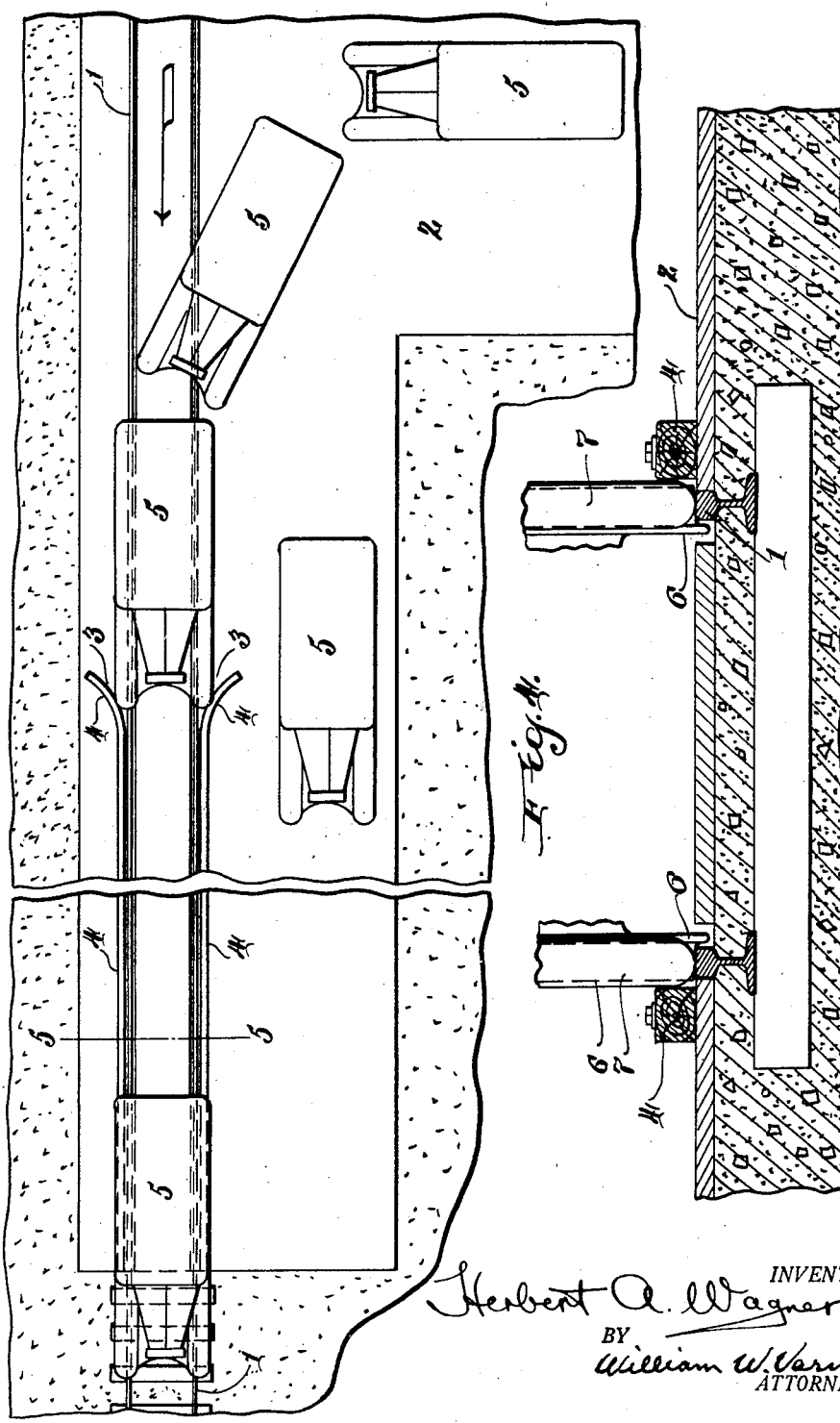

April 21, 1931.                    H. A. WAGNER                    1,801,469
       SYSTEM OF TRANSPORTATION AND MEANS FOR ACCOMPLISHING THE SAME
                   Filed Jan. 22, 1929      10 Sheets-Sheet 4

Herbert A. Wagner INVENTOR
BY William W. Varney ATTORNEY

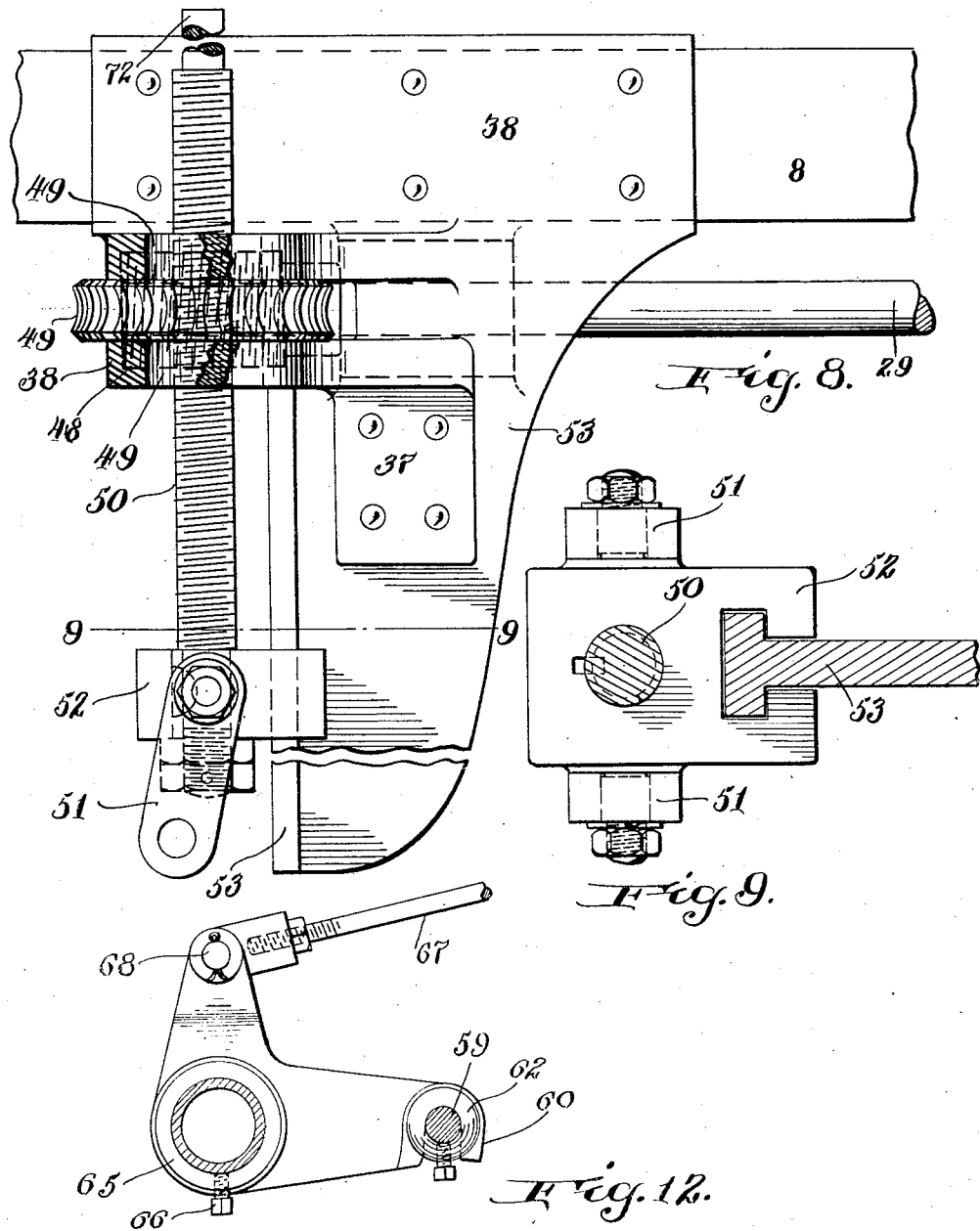

April 21, 1931.   H. A. WAGNER   1,801,469
SYSTEM OF TRANSPORTATION AND MEANS FOR ACCOMPLISHING THE SAME
Filed Jan. 22, 1929   10 Sheets-Sheet 6

INVENTOR.
Herbert A. Wagner
BY
William W. Varney
ATTORNEY

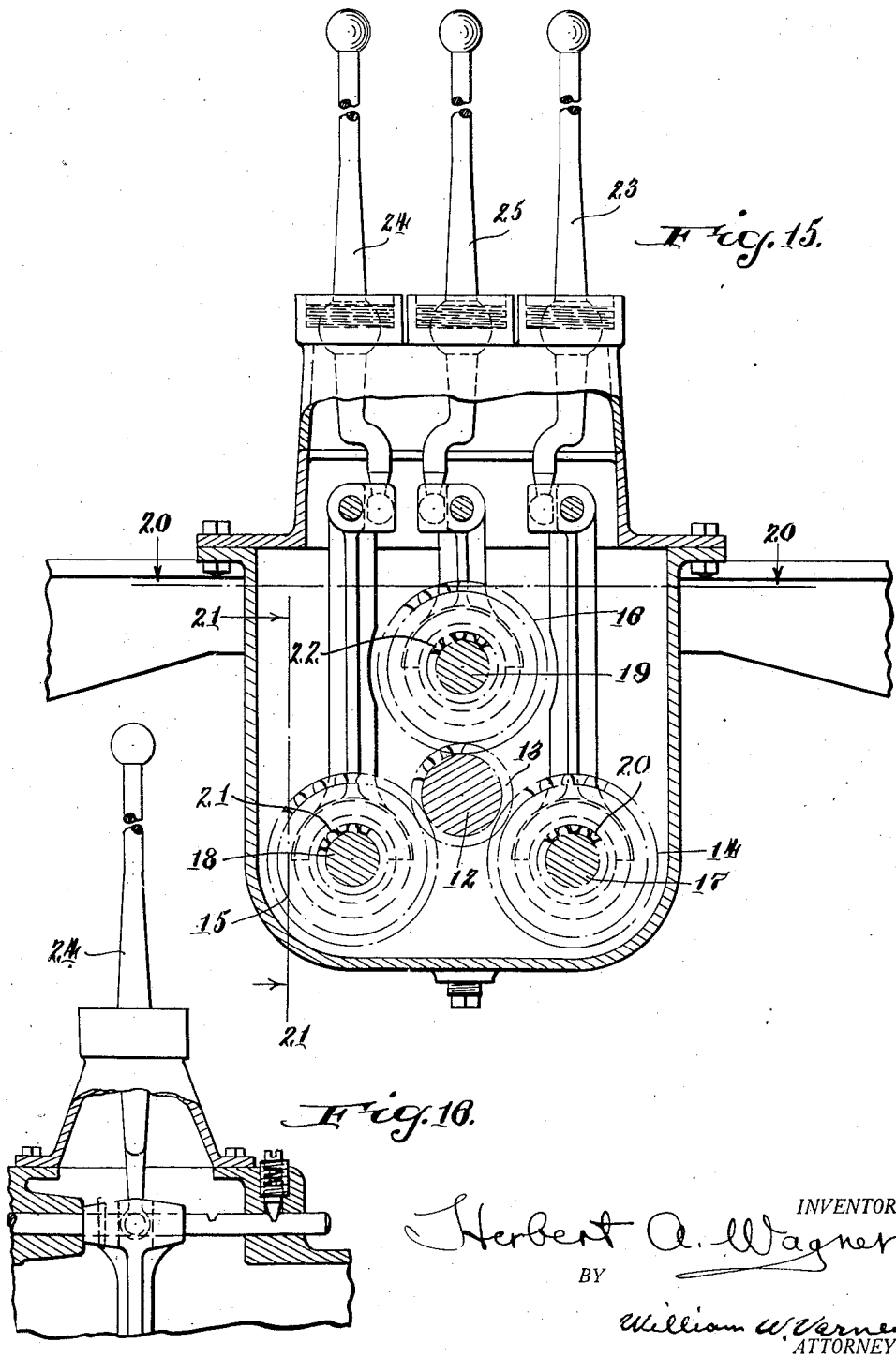

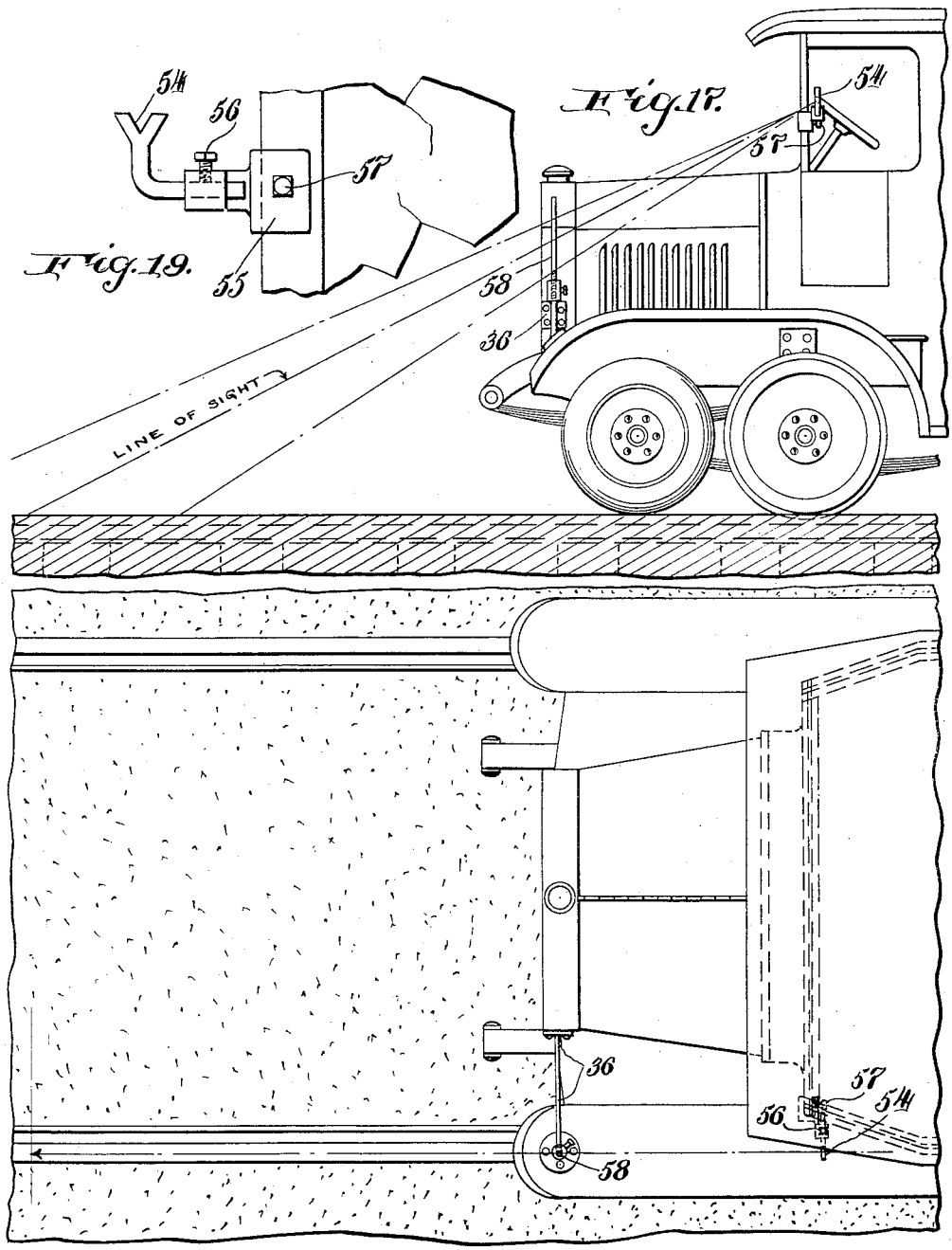

April 21, 1931.  H. A. WAGNER  1,801,469
SYSTEM OF TRANSPORTATION AND MEANS FOR ACCOMPLISHING THE SAME
Filed Jan. 22, 1929    10 Sheets-Sheet 10

Patented Apr. 21, 1931

1,801,469

UNITED STATES PATENT OFFICE

HERBERT A. WAGNER, OF BALTIMORE COUNTY, MARYLAND

SYSTEM OF TRANSPORTATION AND MEANS FOR ACCOMPLISHING THE SAME

Application filed January 22, 1929. Serial No. 334,229.

The object of my invention is to provide a system of transportation whereby passengers and freight may be conveyed from place to place between terminals located on ordinarily constructed highways, utilizing also for means of transportation, the convenience and speed possibilities of fixed rail construction as a part of the connecting link between terminals.

A further object of my invention is to provide vehicles adapted to run on the aforementioned dual roadway construction.

A further object of my invention is to provide means whereby said vehicle may be self-contained and may be operated either on public highways, or on fixed railway tracks, at the will of the operator.

A further object of my invention is to provide means for adjusting the running wheel system of the vehicle to suit the roadbed construction upon which it operates.

A further object of my invention is to provide a locking means for locking the steering-gear of the vehicle when operated on fixed rails.

A further object of my invention is to provide a dual driving mechanism with means for unifying the same in action.

A further object of my invention is to provide means to take the load of the vehicle upon a plural, or a single, wheel system at pleasure, selectively.

A further object of my invention is to provide means to take the load of the vehicle upon a plural, or a single, wheel system at pleasure, selectively, and to provide power-operated means for so doing.

A further object of my invention is to provide means for guiding and aligning the wheel systems when transferring the vehicle from one described form of road-bed to the other.

A further object of my invention is to provide stabilizing wheels in vehicles having short wheel bases.

A further object of my invention is to provide in a railroad vehicle an auxiliary set of driving wheels provided with irregular metal-shod resilient treads.

A further object of my invention is the providing an adjusting means for relatively and independently adjusting the various supporting wheels.

With the foregoing and other objects in view, my invention consists of the methods employed, combination and arrangement of systems, apparatus and means as hereinafter specifically provided and illustrated in the accompanying drawings wherein is shown the preferred embodiment of my invention, but it is understood that changes, variations and modifications may be resorted to which come within the scope of the claims hereunto appended.

In the drawings of the herein-described embodiment of my invention, Figure 1 is a view in elevation of the vehicle adapted to run on either ordinary highway construction, or on ordinary railway construction, at pleasure. As will be seen, the vehicle is provided with two separate and characteristically different sets of wheels, each set consisting of two pairs of wheels. One set of wheels is provided with rubber tires constituting suitable means for operating on the common highway, the other set being provided with metal tires with flanges constituting suitable means for operating on railroad tracks.

In the view shown, the vehicle is on a railroad, and both the highway means for supporting the vehicle and providing tractive force and the rail means for supporting and providing traction are operative at the same time. In practice, this joint operation may be availed of, but preferably the highway means is partially or entirely eliminated when the vehicle is on the rails, except as required for stabilizing purposes, by raising the highway operating means clear of the track by forcing the railway means down through suitable mechanism shown in order to take the entire load; this change may be accomplished also by adjusting the highway means relative to the vehicle according to the modification shown in Fig. 14. Both forms of adjusting mechanism shown provide means for raising and lowering one set of wheels with respect to the other, so that either set may be made to entirely clear the roadway or be made to take the whole weight or any desired part of the weight of the vehicle.

In Fig. 1, I have shown a typical truck body with a forward and a rear end; but I do not limit myself to this, as cars built embodying my invention may operate in either direction and from either end, as service conditions may require, or from both ends by suitably arranged controls; consequently, the chains on the resilient tired wheels may operate in the front or in the rear, as desired.

Also, in Fig. 1, traction wheels 6 are shown as being driven through shaft 18 entering an axle gear case indicated as for a bevel-gear drive, while traction wheels 7 are indicated as being driven by shaft 17 through a worm drive. Either worm drive or bevel gear drive would be suitable for both sets of axles and wheels, and the difference indicated in the drawings is simply to indicate that either form of drive may be used and to make the drawings clearer by avoiding the overlapping of parts which would appear in nearly the same horizontal plane while having ample physical clearance by being placed in different longitudinal vertical planes.

Figure 7:
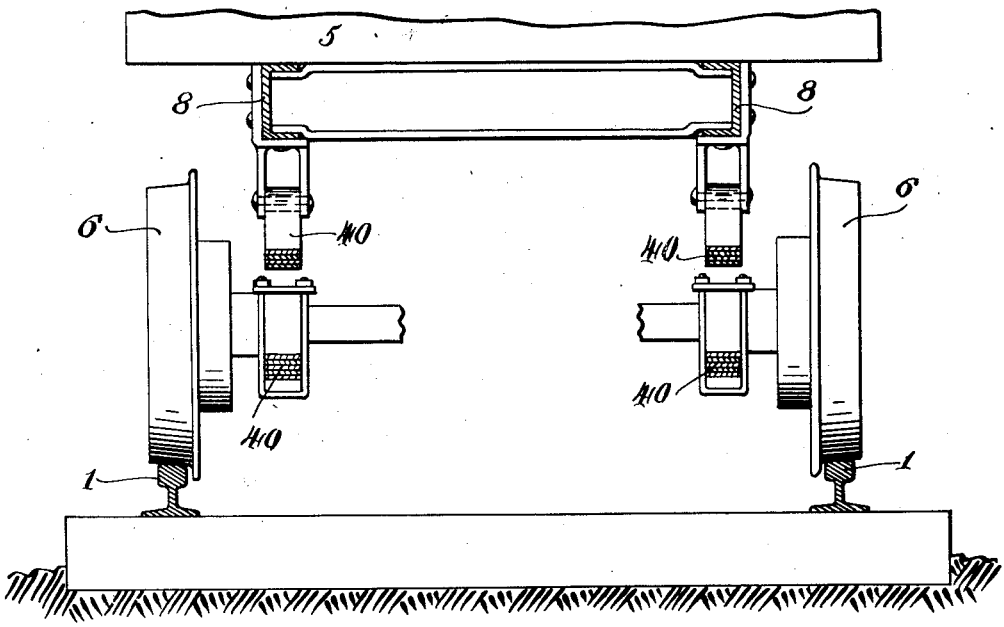
Figure 10:
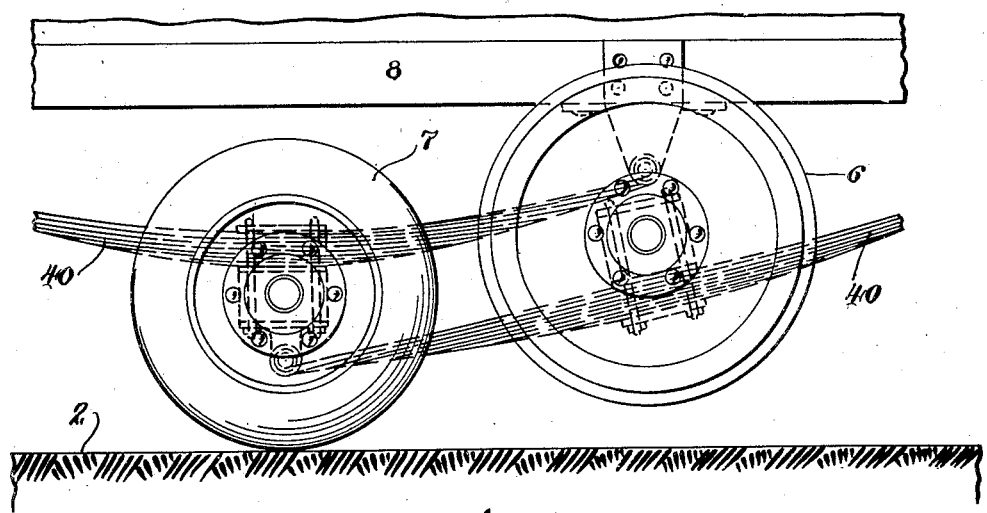
Figure 11:
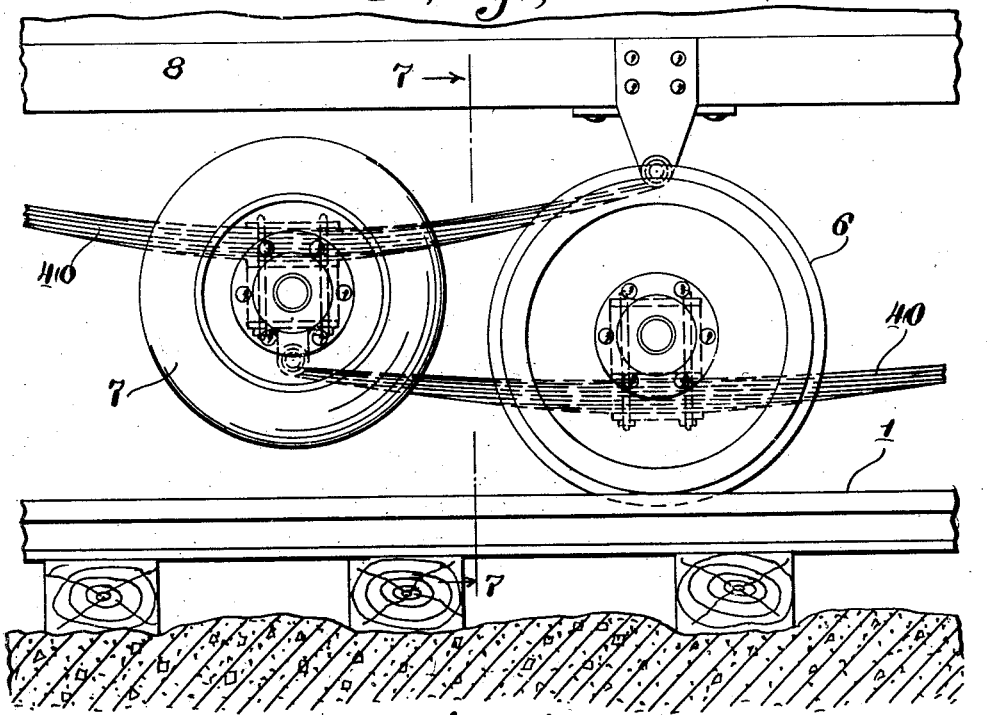
Figure 13:
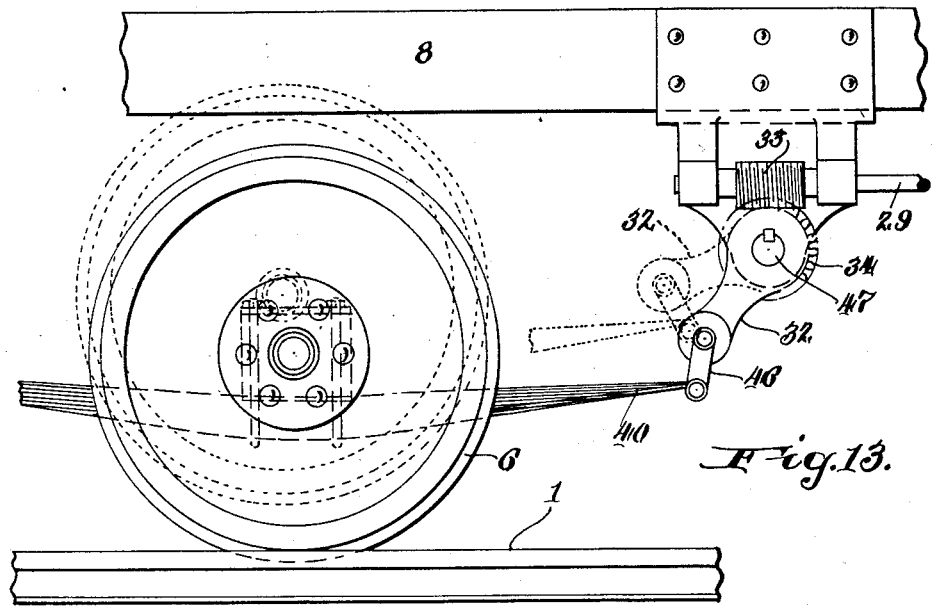
Figure 14:
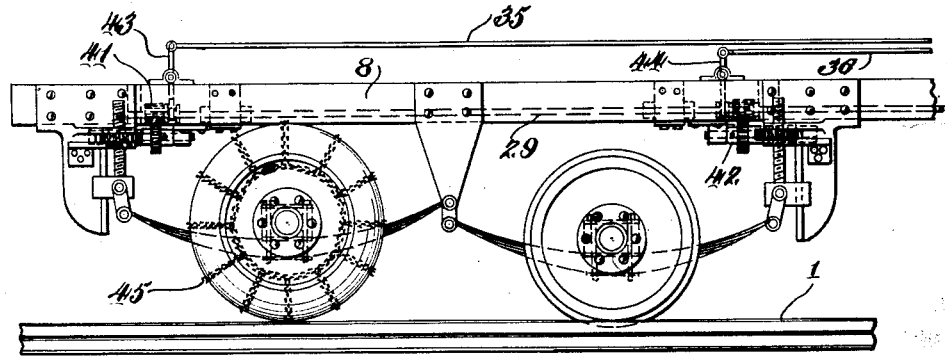

Figure 2 is a partial plan view of the driving and running gear of the vehicle, shown in Fig. 1; Fig. 3 is a partial plan view of a modified form of the driving gear; Fig. 4 is a plan view of the highway and track layout where convenience permits of a guiding means for safely transferring the vehicle from one form of road construction to the other; Fig. 5 is a view taken through 5—5 of Fig. 4, with the addition of the wheels partially shown in place. This construction is especially useful at road crossings, terminals, and other similar places, other than on city paved streets where the guiding means would be objectionable; Fig. 6 is a plan view of a portion of the vehicle containing the highway steering mechanism, and particularly shows the locking device for said steering mechanism for locking the same when the vehicle is operated upon fixed rail construction; Fig. 7 is a sectional view taken on line 7—7, of Fig. 11, showing the flanged wheels only in contact with the roadway; Fig. 8 is a view of a portion of the vehicle showing in detail the means for changing the relative position of and adjusting the supporting wheels; Fig. 9 being a sectional view taken through 9—9 of Fig. 8; Fig. 12 is an enlarged view of the steering-gear locking mechanism, being a sectional view taken through 12—12 of Fig. 6; Fig. 10 shows a portion of the rear truck running-gear in elevation, the wheels for operating on the ordinary highway being in contact with the highway surface, and the wheels for the fixed rail construction being raised out of operation; Fig. 11 is the reverse of Fig. 10, that is, the wheels for fixed rail construction are in contact with the rails and the wheels for the ordinary highway construction are elevated out of contact; Fig. 13 shows a modified form of gear for raising or lowering the respective sets of wheels relatively to each other and to the vehicle; Fig. 14 shows a further modification of the arrangement of the springs and raising and lowering mechanism; Fig. 15 is a fragmentary sectional view taken through transmission gears on the line 15—15, of Fig. 2; Fig. 16 being a detail of the shift lever and its locking means; Fig. 17 is an aligning means for positioning the vehicle with reference to the fixed rail construction or the railroad tracks where the device shown in Fig. 4 is impracticable, such as on paved streets; Fig. 18 is a plan view of the aligning device shown in Fig. 17; Fig. 19 illustrates a detail of the rear aligning device, or sight, shown in Fig. 17, and particularly shows the means for adjustment both vertically and horizontally.

Figure 20:
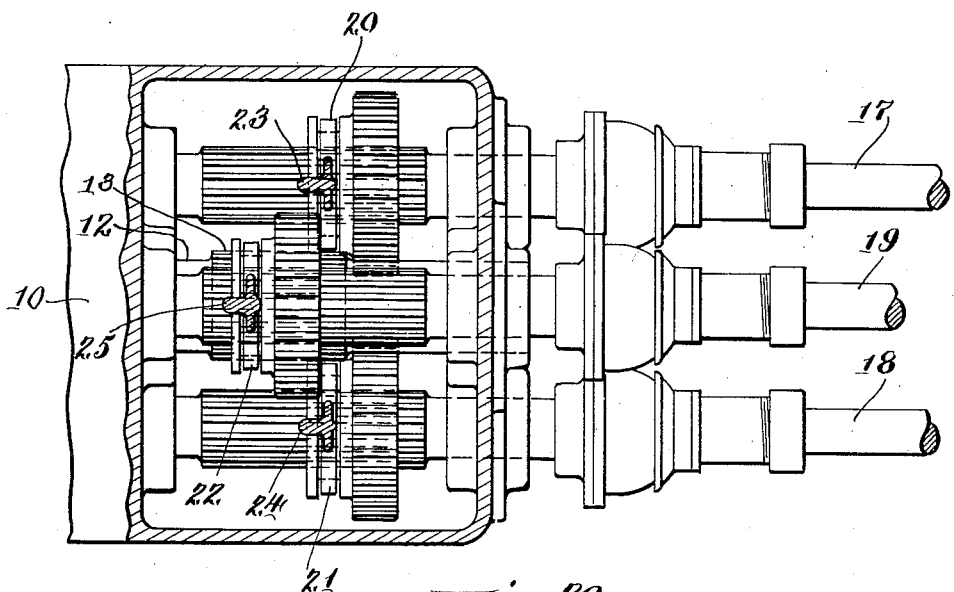
Figure 21:
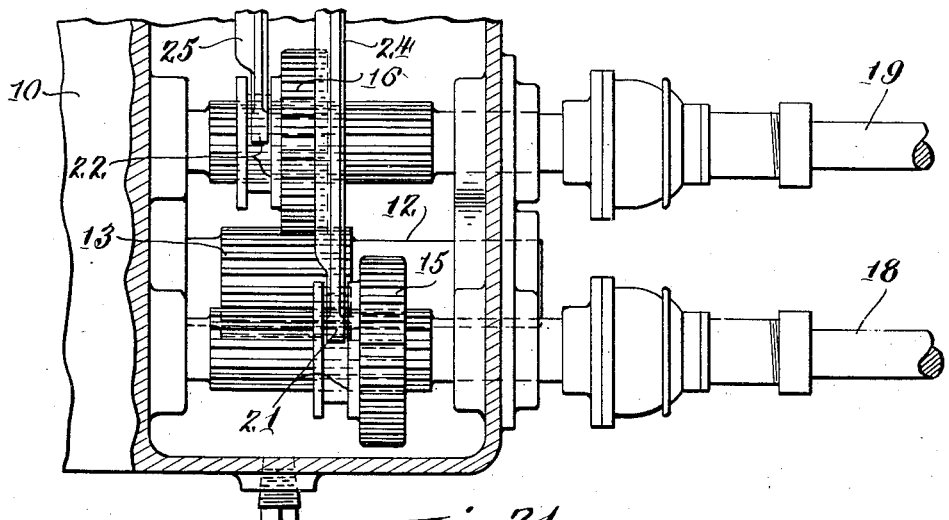

Fig. 20 is a fragmentary sectional plan view taken on the line 20—20, of Fig. 15; Fig. 21 is a fragmentary sectional view in elevation, taken on the line 21—21, of Fig. 15.

By reference to the drawings I will now describe in detail the embodiments of my invention therein shown, beginning, first, with the special mechanisms employed and continuing with the usual automotive mechanisms required to co-operate with the said special mechanisms in the complete practical application of my invention.

Similar numerals refer to similar parts throughout the several views.

In Fig. 1, 8 is the chassis frame to which is secured bracket 77, which bracket carries one end of spring 40', the other end of spring 40' being carried by bracket 78 through the medium of links 79. Wheels 7 operate in bearings 80 by means of suitable axles, said bearings being carried by spring 40' and carrying in turn one end of spring 40. The axles of wheels 6 operate in bearings 73 carried by spring 40. The other end of spring 40 is supported, or carried, by links 51. I have described the springs, bearings and wheels with the same numerals for both the forward and the rear wheels whether driven or not, the construction being similar, so far as the springs are concerned. 74 is the cab, or operator's station which I have shown as of the conventional type ordinarily found in trucks and, for convenience, have led my controls into that vicinity. I do not wish to limit myself, however, to the construction shown, as the operator's station and controls may be at any desired position, or may be duplicated for double end operative vehicles.

18 is the drive-shaft operating differential 75, which differential operates wheels 6 and is shown, for convenience, as of the bevel-gear type. Shaft 17 operates differential 76 and as shown is of the worm-gear type. Shaft 29 operates the worm-wheel nuts 49 which raise and lower screws 50 to which screws are attached guiding trunnions 52; these trunnions carry links 51, which links carry one end of spring 40 whereby upon the operation of worm-wheel nut 49 the end of spring 40 attached to the links 51 is raised or lowered.

Shaft 29 is operated by sprocket chain 27 driven by sprocket wheel 26, which sprocket wheel is driven by shaft 19 through the reverse gear mechanism 69 controlled by lever 70 and the clutch mechanism controlled by lever 71 operating in conjunction with the reverse gears 69. By means of this reverse gear and clutch, which is of well-known construction and is not shown in detail, shaft 19 at the end attached to sprocket-wheel 26 may be operated in either direction and at any speed desired, thus adjusting the ends of spring 40 and the wheels 6 to which they are attached, the clutching mechanism permitting a slipping, if desired; and this may be accomplished irrespective of the other movements of the truck or driving mechanism, provided the main engine is running to furnish power.

Referring to Fig. 4, 1 shows an ordinary railroad track construction. 2 shows an ordinary highway construction. 3 is the juncture of the railroad and the highway. 4 is a guiding means at said juncture; in the drawings, it is shown as a guiding rail, or log. In paved streets this guiding means is omitted, as the vehicle may be centered on the rails by other means, such as is shown in Fig. 17; but in rural sections, where platform construction may be resorted to at highway crossings, it is desirable to use the guiding means to insure proper tracking. 5 is a vehicle which may be of any desired character, passenger, freight, or for other purposes, and may be driven along highways and on to the railway on its highway running gear, when its running gear may be shifted so that a flanged running gear construction is brought into operation in connection with the highway running gear, or the highway running gear may be eliminated from further operation. This may be accomplished when and as desired, as, for instance, in crowded city traffic without even stopping the vehicle, as will be shown in the details. 6 are flanged railway wheels intended for running on ordinary railway track construction 1. 7 are preferable resilient tired wheels for operating on ordinary highway construction.

Referring to Figs. 6 and 12, which show the steering-gear locking mechanism, 64 is the axle on which is fulcrumed and operates locking member 60 held between collars 65. 59 is the steering radius rod provided with conjugate locking members 61 and 62 which are secured to said rod by any suitable means, such as, set screws 66. In these conjugate locking members 61 and 62 locking member 60 engages and is maintained in position by rod 67. 67 is the locking control rod fulcrumed to locking member 60 by pin 68. To unlock the steering mechanism locking control rod 67 is pushed, thereby pushing the locking member 60 out of engagement and into the position shown by dotted lines. Rod 67 may be locked by any well-known means to prevent movement of locking member 60.

In Fig. 1, I have shown the flanged wheels and the resilient tired wheels interconnected by a compound spring construction. I wish it understood that these two spring and wheel constructions are mutually co-operative in operation, but may be independently brought into operation, or withdrawn therefrom. In my preferable construction shown in Figs. 1, 2 and 8, it should be noted that when the flanged wheels are lowered by the action of the screw, after contact is made between these wheels and the rails, a continued movement of the screw has the effect of transferring a part of the weight of the car from the rubber tired wheels to the flanged tires. This transfer of weight may be continued at will until the entire weight of the car is carried by the flanged wheels and the rubber tired wheels are left barely touching the rails, and up to this point, due to the co-operative action of the screw and the springs, there will be little change in the level of the chassis frame or the floor of the car supported thereby. In this position of adjustment, or with some part of the weight still left upon the rubber tired wheels, these wheels will act as stabilizers to prevent nosing and pounding, or see-sawing, so often noticeable with railway cars of short wheel base. With a more nearly equal division of the weight the combined action of the flanged and rubber-tired wheels will approximate the action of a four-wheeled bogie truck with four-wheel drive. In this latter conditions of adjustment traction may be provided by both sets of wheels and the flanged tired wheels may be considered as supplementing the rubber-tired wheels and acting as a means for guiding them along the rails. A still further movement of the adjusting screw mechanism will lift the rubber-tired wheels entirely from the rails. The drawing in Fig. 1 shows a single means for accomplishing the described change of operation. A modification is shown in Fig. 14, whereby the wheels may be independently positioned with relation to the body of the vehicle and to each other. I wish, however, to stress the fact that the compound spring suspension shown in Fig. 1, and which is one part of my invention, embodies several distinct and novel advantages as compared with other possible forms of spring suspension, such as that shown in Fig. 14. If a motor car frame is raised up by any means the first result is the expansion of the supporting springs as they are relieved of the weight of the car. Consequently, in order to raise the wheels to clear road surface by a few inches it is necessary to raise the car frame by many more inches. In my form of construction in Fig. 1, when wheels 6 are forced down by the adjusting device to take the entire weight of the car, springs 40' are relieved of only one-half, approximately, of the weight formerly resting upon them and their expansion will, therefore, be approximately one-half. The result is that a given clearance of the wheels 7 from the roadway can be effected by raising the frame of the car by only one-half the distance which would otherwise be necessary.

The height of the car floor above the roadway can, therefore, be maintained more nearly the same for the different operating conditions.

Likewise, when the wheels 6 are raised clear of the roadway, varying flexures of the spring 40' by reason of varying loads or uneven road conditions will cause less differences in road clearance by the wheels 6, for the reason that the compression of the springs 40' will also lift the wheels 6 by approximately half of the amount of such compression. It is, therefore, unnecessary, with this form of construction to provide for as much road clearance for the wheels 6 as would otherwise be required. Furthermore, the compound spring construction is simpler, has less parts, requires less space, allows the wheel systems to be brought closer together and maintains a constant radial distance between wheel centers.

I have discovered that railway vehicles having short wheel bases between the flanged wheels may be stabilized and will have the same, or better, stabilization than vehicles having longer wheel bases with four-wheel trucks under each end by providing adjustable stabilizing wheels, without flanges, operating on the rails and taking any desired proportion of the weight of the vehicle; and I have found that these stabilizing wheels should be, preferably, of a resilient character, such as is provided by rubber tires, and that they will under ordinary dry conditions prevent nosing as well as pounding or see-sawing.

I have also discovered that under ordinary wet conditions the rubber tired wheel so cleans and dries the track that the metal wheels have improved traction for driving.

I have further discovered that under conditions of sleet, snow and ice, the rubber-tired wheels, if provided with chains, will greatly increase the tractive effect which could be obtained under such conditions with metal-tired wheels alone. The rubber tire with suitably applied chains provides a convenient form of irregularly metal-shod resilient wheel for breaking or cutting through ice or snow which may be congealed on the rails.

While the vehicle is in motion, I have found it extremely desirable to be able to control independently the application of power to each driving unit, or set of wheels; to raise or to lower relatively each of said driving units; to lock or to unlock the steering gear, and to control every movement of the vehicle, including the centering or aligning thereof; and I have provided in my invention means for accomplishing this.

In the partial plan view shown in Fig. 2, 9 is the engine drive shaft. 10 is the ordinary transmission gear and casing, as usually found in automotive trucks, controlled by lever 11. In Figs. 15, 20 and 21, 12 is the drive shaft from the transmission gear 10 and which having teeth 13 integral therewith, drives gears 14, 15 and 16 when in mesh, which gears drive shafts 17, 18 and 19, respectively, through clutches or spline gears 20, 21 and 22 operated by levers, 23, 24 and 25, respectively. Shaft 17 drives the differential gears which drive wheels 7; shaft 18 drives the differential gears which shaft 19 drives sprocket-drive wheels 6; shaft 19 drives sprocket wheel operates wheel 26 which sprocket wheel operates sprocket-chain 27. Operating shafts 28 and 29 are operated by sprocket-chain 27 through sprocket pinions 30 and 31 secured to said shafts 28 and 29, respectively.

Referring to Fig. 13, operating shaft 29 operates crank 32 by means of worm 33 and worm wheel 34, thus raising or lowering the end of the spring 40, thereby raising or lowering flange wheel 6, relatively.

Referring to Figs. 7, 8, 9 and 14, shaft 29 operates the two elevating and lowering gear mechanism 41 and 42 controlled by levers 43 and 44, respectively; this gives a selective movement for each wheel independently, as desired. Levers 43 and 44 are controlled by rods 35 and 36 leading to the vicinity of the operator.

Referring to the modification of the driving mechanism shown in Fig. 3, where it is desirable for simplicity to reduce mechanism, a single control power mechanism may be employed to operate both sets of driving and supporting wheels simultaneously, one or the other idling, as the case may be, when the other is driving. This is accomplished by driving both differentials by drive shaft 12 without intermediate gearing, 11' being the shift or control lever and 25' being the lever controlling the shift gear or control mechanism for the driving of shaft 19 operating the sprocket wheel 26; this mechanism being taken off from a gear on the engine drive shaft, not shown.

For lighter vehicles, the modification shown in Fig. 13 for raising and lowering the respective wheels may be desirable, the spring 40 being linked to crank 32 by links 46. The crank 32 is operated by shaft 37 to which it is secured, said shaft being operated by worm wheel 34 and worm 33, which worm is secured to change control shaft 29. Worm wheel 34 is only partially threaded and blank in other portions, so that at the limit of the movement of lever 32 in either direction the worm will run off of the threads on the worm wheel to prevent destruction of the same by excessive strain; this same object being obtained in the mechanism shown in Fig. 8 by the smooth section at the limits of the movement of screw 50 at 72. A smooth end may also be provided at the other end of this screw for the same purpose, not shown.

45 are chains on the resilient tired wheels 7 for use in inclement weather.

Referring to Figs. 17, 18 and 19, 54 is the V or rear sight, which sight may be adjusted horizontally by its horizontal member operating in support 55 and being secured by set-screw 56. The support 55 is adjusted vertically on the edge of the wind-shield or other member of the vehicle and is retained in position by set-screw 57. The fore-sight 58, as shown, is a vertical member secured to align with the rear sight on the rail.

By means of these two sights and sighting up and down the vertical member 58, aligning a considerable section of the track parallel with the line of sight, the vehicle may be properly placed with reference to the tracks. Fore-sight 58, it will be observed, is braced both horizontally and vertically by brace 36 to insure rigidity.

Having thus described my invention, what I claim and desire to secure by Letters Patent is:

1. An automotive car or vehicle having two sets of guiding and supporting wheels, one set being adjustable as supporting and guiding wheels with respect to the other set with adjacent wheels in both sets lying in the same plane.

2. In an automotive car or vehicle, two sets of supporting wheels both of said sets operating in relative alignment, both sets of wheels being normally attached to the car, one set having tires suitable for operation on the common highway and the other set having flanged tires suitable for operation on a railroad track, and means within the car itself for transferring the car weight, in whole or in part, from one set of wheels to the other.

3. In an automotive car or vehicle the combination of two sets of supporting wheels, means for transferring a substantial part or all of the weight of the car from one set of wheels to the other by raising or lowering one set of wheels with respect to the other set, means for supplying tractive power to one pair of each of said sets of wheels and means for keeping all the wheels on either side of the car in substantially the same plane.

4. An automotive car having two or more pairs of supporting wheels, two of said pairs of wheels each having an auxiliary pair of wheels, means for adjusting said auxiliary wheels at will from a non-supporting position to become the partial or entire support for the car and to operate in line with the first said pair of wheels.

5. An automotive car having in addition to a pair of supporting driving wheels and a pair of supporting steering wheels, two pairs of auxiliary wheels adjustable at will to act as guiding wheels for the first said pair of wheels on the same line of road contact or to be withdrawn from the roadway.

6. In an automotive car the combination of a power motor, two or more traction wheels, two steering wheels, a supplementary supporting wheel for and in line with each of two of said traction wheels and for and in line with each of said steering wheels, means for raising and lowering the said supplementary wheels at will and means for transmitting power from the motor to the said traction wheels and also to the respective supplementary wheels.

7. A self-propelled vehicle provided with a plurality of pairs of running wheels mutually co-operating to support the entire weight of said vehicle in its path and while changing from a fixed path to an unfixed path, one of said pairs of running wheels being operative for fixed path guidance and another pair of said running wheels for an at will guidance both of said pairs operating in the same paths.

8. A self-propelled vehicle provided with a plurality of pairs of running wheels mutually co-operating to support the entire weight of said vehicle in its path and while changing from a fixed path to an unfixed path, one of said pairs of running wheels being operative for fixed path guidance and consisting of flanged wheels of railway construction, another of said pairs of running wheels without flanges for at will guidance on highway surfaces and provided with steering mechanism both of said pairs operating in the same paths.

9. A self-propelled vehicle provided with a plural running gear mutually co-operating to support said vehicle in the same path and while changing from a fixed path to an unfixed path, one of said running gears being operative for fixed path guidance, another of said gunning gears being for at will guidance, and means for adjustably supporting said vehicle on said running gears.

10. A self-propelled vehicle provided with a plural running gear mutually co-operating to support the entire weight of said vehicle in the same path and while changing from a fixed path to an unfixed path, one of said running gears being operative for fixed path guidance, another of said running gears for at will guidance, and means within said vehicle and for adjustably supporting said vehicle on said running gears consisting of means for relatively positioning said running gears with reference to the surface to be operated upon, said means being operative at will while one or more of said running gears are operating.

11. In a railway vehicle, means for stabilization consisting of wheels of a rigid character contacting with the rails and tending to support and drive said vehicle in conjunction with additional wheels of a resilient character also contacting with said rail and co-operating with the first said wheels to support said vehicle in its entire weight.

12. In a railway vehicle provided with flanged metal wheels to operate on rails, means for driving said flanged wheels, resilient tired wheels operating on the same rails with the flanged wheels to stabilize the vehicle and means for distributing or adjusting the entire load of said vehicle between said two sets of wheels.

13. An automotive car or vehicle having two sets of driving, guiding and supporting wheels, one set being adjustable as supporting and guiding wheels with respect to the other set, and means for driving either of said sets of guiding and supporting wheels independently and selectively.

14. An automotive car or vehicle having two sets of driving, guiding and supporting wheels, one set being adjustable as supporting and guiding wheels with respect to the other set, and means for driving both of said sets of guiding and supporting wheels as a single operating unit.

15. A self-propelled vehicle having two sets of driving, guiding and supporting wheels, one set being adjustable with relation to the other and means for vertically adjusting in relatively opposite directions both sets of wheels simultaneously with reference to the vehicle.

16. In a self-propelled vehicle having two sets of driving, guiding and supporting wheels, means for transferring the weight and operation of the vehicle from one of said sets of wheels to the other without appreciably changing the height of the frame and floor of said vehicle above the roadway.

17. In a self-propelled railway car provided with flanged metal driving wheels to operate on the rails, auxiliary driving wheels having resilient treads operative on the same rails and means for adjusting or distributing at will the entire load of said car and the tractive effect between said two sets of wheels.

18. In a self-propelled railway car provided with flanged metal driving wheels to operate on rails, auxiliary driving wheels having irregularly metal-shod resilient treads operative on the same rails, and means for adjusting or distributing at will the load of said car and the tractive effect between said two sets of wheels.

19. A self-propelled vehicle provided with flanged wheels to operate on rails and an auxiliary set of wheels to operate on the same rail simultaneously with the said flanged wheels and provided with irregular metal elements contacting with said rails.

20. A railway vehicle provided with flanged wheels to operate on a rail and also provided with resilient wheels without flanges aligned to operate on the same rails simultaneously with the said flanged wheels so that the entire load or any part thereof may be carried by both or either of said two sets of wheels.

21. In an automotive car or vehicle, two sets of supporting and driving wheels, both sets of wheels being normally attached to the car, one set having tires suitable for operation on the common highway and the other set having flanged tires suitable for operation on a railroad track, and means within the car itself for transferring the car weight, in whole or in part, from one set of wheels to the other, and means for adjusting said wheels relatively, said two sets of wheels being in relative alignment.

22. In an automotive car or vehicle, two sets of supporting and driving wheels, both sets of wheels being normally attached to the car, one set having tires suitable for operation on the common highway and the other set having flanged tires suitable for operation on a railroad track, and means within the car itself for transferring the car weight, in whole or in part, from one set of wheels to the other, and means for adjusting said wheels relatively consisting of relatively changing their support with reference to the vehicle.

23. In a railway vehicle provided with flanged metal wheels to operate on rails, resilient tired wheels operating on the same rails with the flanged wheels and means for distributing or adjusting the load of said vehicle between said two sets of wheels while said vehicle is in motion, so that the entire load or any part thereof may be carried by both or either of said two sets of wheels.

24. In a self-propelled vehicle having two sets of driving, guiding and supporting wheels, means for simultaneously raising one of said sets of wheels from the road surface and lowering the other of said sets to the road surface, and means for operating one of said driving wheels while relatively adjusting said wheels with reference to the roadway surface.

25. In a self-propelled vehicle, power actuated means for operating a set of driving wheels to propel the vehicle, plural sets of supporting wheels, and power actuated means for relatively changing the load of the vehicle between said sets of supporting wheels, said two power actuated means obtaining power from a single source.

26. In a self-propelled vehicle, power actuated means for operating a set of driving wheels to propel the vehicle, plural sets of supporting wheels, power actuated means for relatively changing the load of the vehicle between said sets of supporting wheels, said two power actuated means obtaining power from a single source, and means provided to permit the operation of either independent of the other.

27. In a vehicle provided with metal tired wheels operating on a metal surface, a stabilizing means consisting of resilient tread wheels operating in conjunction with said metal tired wheels so that the entire load or any part thereof may be carried by both or either of said two sets of wheels.

28. In a vehicle provided with metal tired wheels operating on a metal surface, a stabilizing means consisting of resilient tread wheels operating in conjunction with said metal tired wheels and means for distributing the load on said metal tired wheels and said resilient tread wheels so that the entire load or any part thereof may be carried by both or either of said two sets of wheels.

29. In a vehicle provided with metal tired wheels operating on a metal surface, a stabilizing means consisting of pneumatic tired wheels operating in conjunction with said metal tired wheels so that the entire load or any part thereof may be carried by both or either of said two sets of wheels.

30. In a self-propelled car or vehicle provided with a plurality of pairs of wheels, an interconnected suspension-spring system whereby the vertical movement of one pair of wheels is transmitted to modify the vertical movement of another pair of wheels.

31. In a self-propelled car or vehicle having two or more pairs of driving wheels a compound system of suspension springs in which the members co-operate to cause the vertical movement of one pair of wheels to modify the vertical movement of another pair of wheels.

32. In a self-propelled car or vehicle provided with a plurality of pairs of wheels, an interconnected suspension spring system whereby the vertical movement of one pair of wheels is transmitted to modify the vertical movement of another pair of wheels consisting of supporting one pair of wheels with springs connected to said car and supporting another pair of wheels with springs supported in part by said first mentioned springs.

33. In a self-propelled motor car adapted to run either on the rails of a railroad track or on the common roadway, and provided with double sets of driving and supporting wheels, adjusting means on the car for adjusting relatively both sets of wheels to operate for driving and supporting the car when on the rails and for causing only one set of driving and supporting wheels to drive and support the car when on the roadway.

34. In a self-propelled motor car adapted to run either on the rails of a railroad track or on the common roadway, and provided with double sets of driving and supporting wheels, adjusting means on the car for shifting part or all of the weight of the car from one set of wheels to the other when on the rails and lifting one set of wheels clear of the roadway when running on the common roadway.

35. In a self-propelled motor car adapted to run either on the rails of a railroad track or on the common roadway, and provided with double sets of driving and supporting wheels, adjusting means on the car for shifting part or all of the weight of the car from either set of wheels to the other when on the rails and lifting one set of wheels clear of the roadway when running on the common roadway.

36. In a self-propelled motor car adapted to run either on the rails of a railroad track or on the common roadway, and provided with double sets of driving and guiding wheels, having a motor geared to said driving wheels, adjusting means on the car for shifting part or all of the weight of the car from either set of driving wheels and from its corresponding set of guiding wheels to the other set when running on the rails and for lifting one set of driving wheels and its corresponding set of guiding wheels clear of the roadway when running on the common roadway.

HERBERT A. WAGNER.